United States Patent [19]

Chicoine

[11] 4,158,833
[45] Jun. 19, 1979

[54] MANUAL DOWNSHIFT DEACCELERATION WARNING LIGHT SYSTEM

[76] Inventor: Gustave J. Chicoine, 1052 Cumberland Pl., San José, Calif. 95125

[21] Appl. No.: 762,162

[22] Filed: Jan. 24, 1977

Related U.S. Application Data

[62] Division of Ser. No. 659,223, Feb. 19, 1976.

[51] Int. Cl.² .......................... B60Q 1/26; H01H 3/16
[52] U.S. Cl. ........................................ 340/72; 340/71; 340/54; 200/61.28; 200/61.88
[58] Field of Search .............................. 340/54, 72, 71; 200/61.27, 61.28, 61.37, 61.88, 61.87, 61.43, 61.85, 61.57, 86, 157, 6 A, 11 J, 11 K; 116/124 M, 124 R, 124 L, DIG. 20, DIG. 1

[56] References Cited

U.S. PATENT DOCUMENTS

| | | | |
|---|---|---|---|
| 1,656,588 | 1/1928 | Johnson | 200/6 A |
| 1,837,281 | 12/1931 | Norris | 200/11 K |
| 1,931,775 | 10/1933 | Stafak | 200/61.28 |
| 2,057,000 | 10/1936 | Bobroff | 200/61.28 |
| 3,268,680 | 8/1966 | Anderson | 200/61.88 |
| 3,296,882 | 1/1967 | Durand | 200/6 A |
| 3,790,729 | 2/1974 | Bradshaw | 200/61.28 |

Primary Examiner—John W. Caldwell, Sr.
Assistant Examiner—Donnie L. Crosland
Attorney, Agent, or Firm—Paul Hentzel

[57] ABSTRACT

A normally open switch is mounted on the gear shift knob and manually operated to activate the rear brake lights during downshifting. The switch is optimally positioned to minimize inadvertent activation of the brake lights. In some embodiments the switch may be repositioned to suit each driver. A flasher unit may be included in the circuitry to cause the brake light to flash during activation.

10 Claims, 7 Drawing Figures

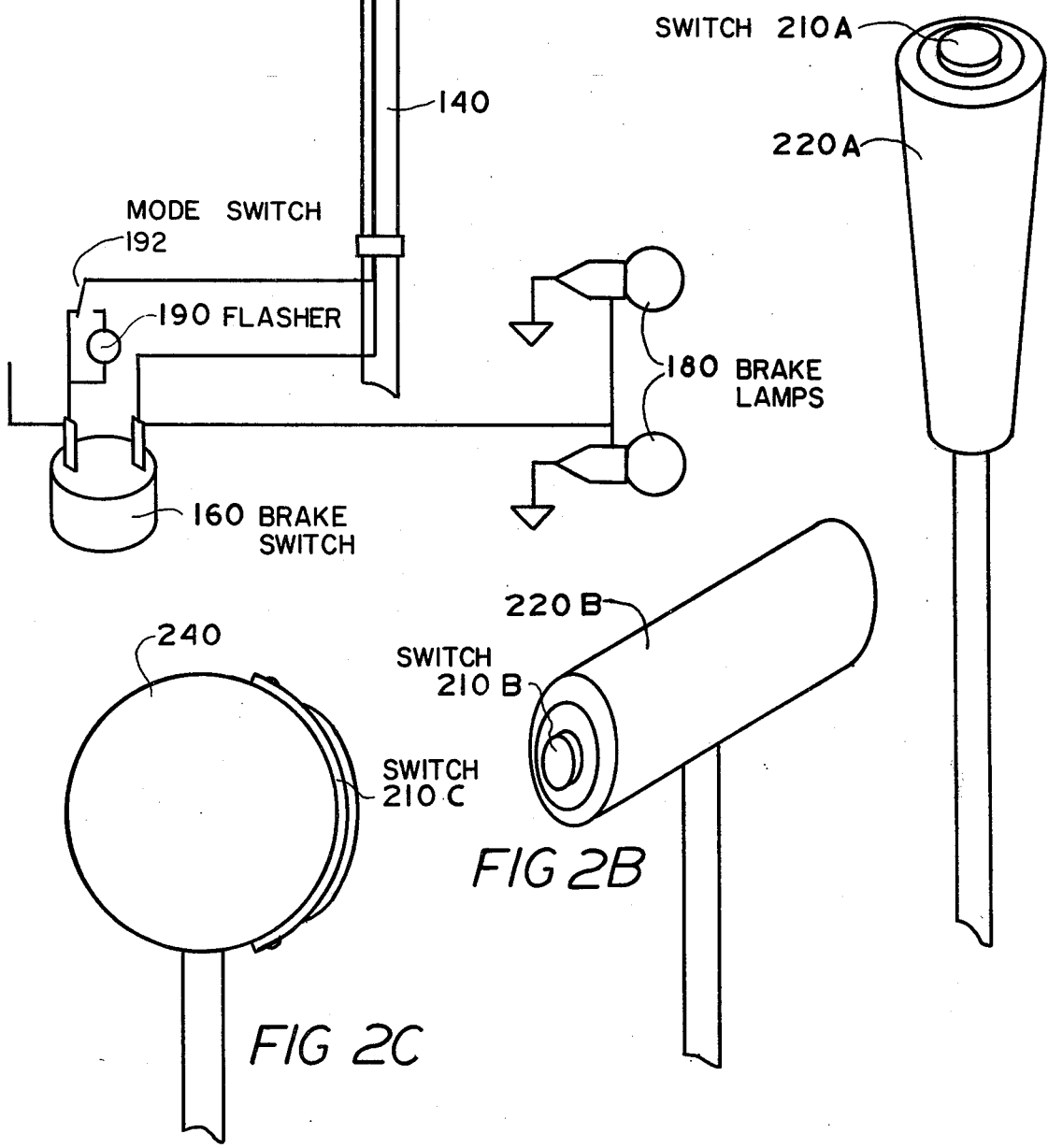

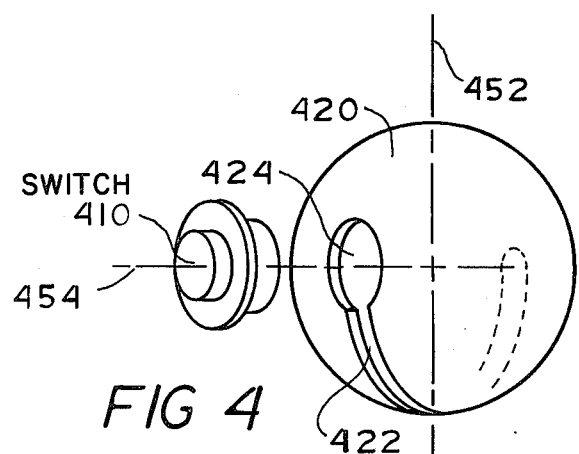
FIG 4
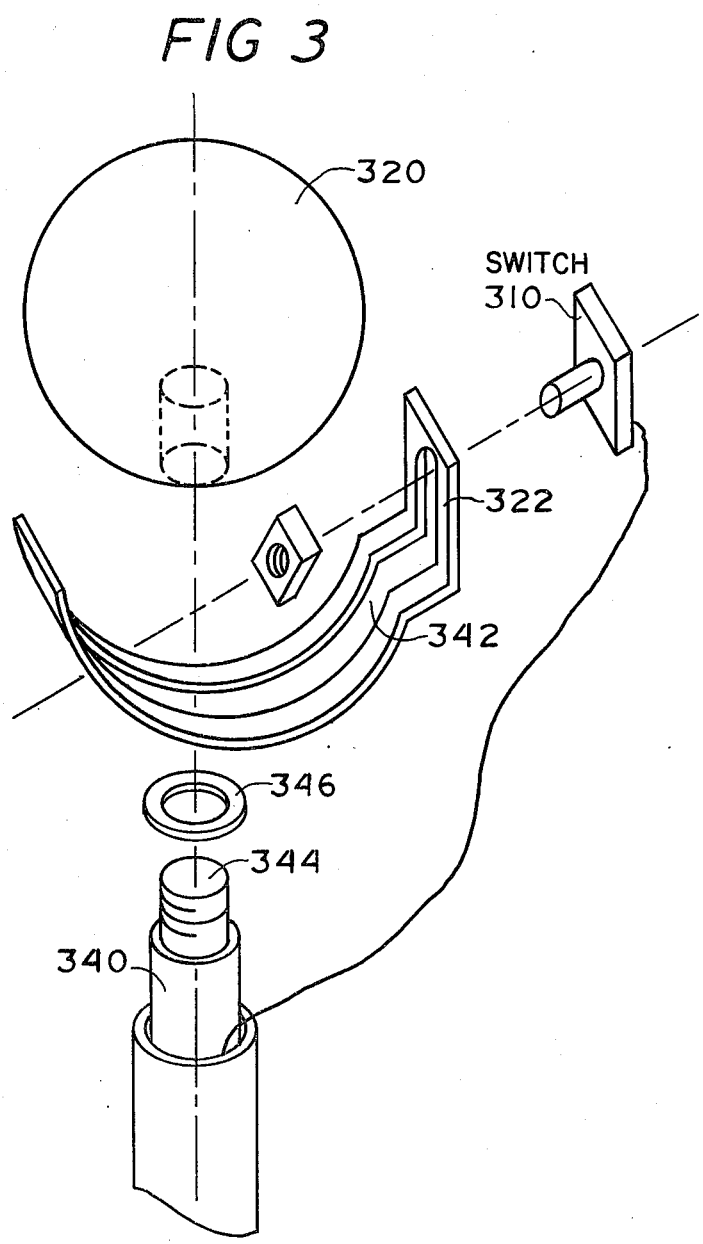
FIG 3
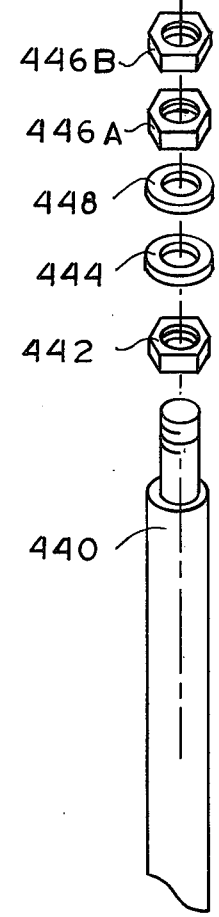

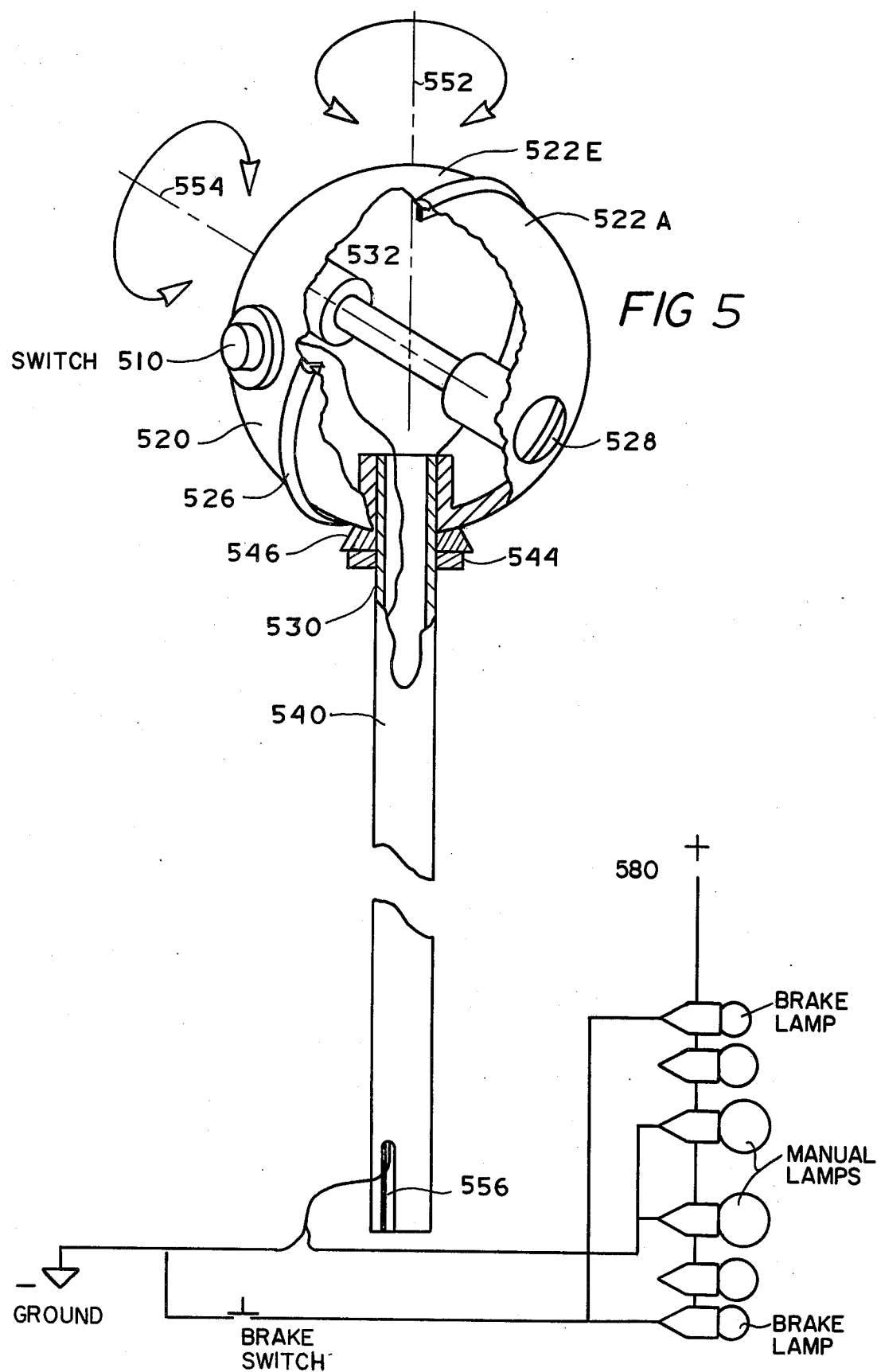

MANUAL DOWNSHIFT DEACCELERATION WARNING LIGHT SYSTEM

This is a division of application Ser. No. 659,223, filed Feb. 19, 1976.

BACKGROUND OF INVENTION

1. Field of Invention

This invention relates to deacceleration warning devices for motor vehicles and more particularly to such warning devices manually activated during downshifting deacceleration.

2. Description of the Prior Art

The current fuel conservation trend toward four and five speed compact automobiles has brought about an increased interest in deacceleration through downshifting. Except for sudden emergency stops or complete stops, automobiles may be slowed down adequately by shifting to a lower gear and using the compression resistance of the engine to reduce the vehicle speed. Modern light-weight vehicles require less braking force than the previous heavier cars, and are therefore more suited for down shifting. Further, the greater number of forward gears provides a greater selection of gear ratios or deacceleration forces. Downshifting from high gear to low gear provides a rapid deacceleration, and downshifting between adjacent gears is effective for less urgent reductions in speed. The small gear ratio increment between adjacent gears provides a smoother downshift deacceleration schedule than is possible with the earlier three speed transmission.

In an effort to further conserve the nation's fossil fuels, automobile manufacturers are re-evaluating the fuel thrifty diesel engine for passenger cars. Diesel engines function very well in the downshift deacceleration capacity due to the high compression ratio required to ignite the fuel vapor. The compression ratio in diesel engines is about twice that of a conventional gasoline engine, and therefore generates about twice the compression resistance per cubic centimeter of stroke for deaccelerating the vehicle. Also, larger stroke diesel engines are required to produce the same horsepower.

Slow downshifting between adjacent gears requires a longer deacceleration period than conventional braking, and therefore requires an awareness of remote traffic conditions as well as conditions close by. Skillful downshifters develop an increased driving awareness by automatically noting these remote conditions; and are therefore more prepared for these conditions as their vehicle approaches them. As a result of this increased awareness, downshift drivers encounter fewer surprises and create fewer hazards on the road.

Downshifting deacceleration requires less effort than the conventional two step braking and shifting operation. After downshifting the driver is in the desired lower gear and is not required to perform the second shifting step. Downshifting is a one step operation in which speed reduction and gear change occur simultaneously. Skillful downshifting conserves brake lining, clutch plates, tires and fuel; and requires less driver effort while increasing driver safety.

SUMMARY OF THE INVENTION

It is therefore an object of this invention to provide a manually operated downshift deacceleration warning device:

which is manually operated during the shift down action with nominal additional effort;
which activates rear warning lamps on a vehicle;
which flashes the rear warning lamps;
which activates the vehicle brake light;
which is inexpensive and easy to install;
which has an easily repositioned activation switch.

Briefly, these and other objects and advantages are accomplished by providing a manually operated switch on the mechanism of the transmission control mechanism which the driver manually moves to shift gears and establish the motor-to-wheel ratio. The switch activates deacceleration warning indicators such as lights on the rear of the vehicle.

BRIEF DESCRIPTION OF THE DRAWINGS

Further objects and advantages of the downshift warning light and the structure and operation thereof will become apparent from the following detailed description taken in conjunction with the drawings in which;

FIG. 1 is a fragmentary view of a deacceleration warning circuit with a manual switch mounted on the gear shift knob and connected in parallel across the brake light switch;

FIGS. 2A, B, and C are modifications of the FIG. 1 switch;

FIG. 3 is an exploded isometric view of a deacceleration warning switch mounted on a gear shift knob via a curved support strip;

FIG. 4 is an exploded isometric view of a gear shift knob having a slot for allowing the knob to rotate about a vertical axis and tilt about a horizontal axis to position a deacceleration warning switch; and FIG. 5 is a broken away view of a gear shift knob formed by two hemispheres which rotate about an vertical axis and an inclined axis respectively to reposition the deacceleration warning switch.

MANUALLY OPERATED BRAKE LIGHT SWITCH

FIG. 1 shows deacceleration warning circuit 100 with manually operated, normally open, push button switch 110 mounted on gear shift knob 120 of a conventional floor transmission. The terminals of switch 110 connect to wires 130A and B wich extend down gear shift stick 140 and connect to the brake light circuit at a convenient place such as the terminals of the normally open brake light switch 160 which is usually mounted proximate the brake pedal. When downshift switch 110 is manually closed, brake switch 160 is bypassed activating an deacceleration warning indicator such as brake lights 180.

Shiftdown switch 110 may be positioned at any height or azimuth on knob 120 to suit the driver. One preferred location is in the upper half of knob 120 in the forward left hand quadrant. This position is normally not occupied by the driver's hand during upshifting and inadvertent activation of the brake lights 180 is avoided. Further, this position is readily accessable to the downshifter during downshifting merely by raising his right hand thumb slightly. Downshift switch 110 is momentarily closed by thumb pressure during the deacceleration period. Another preferred location of switch 110 is in the lower half of knob 120 in the left hand quadrant where it is readily accessable by one or more of the drivers fingers. Operating downshift switch 110 may be accomplished during downshifting by only "lifting a finger" so to speak. In addition, the manual nature of downshift warning light circuit 100 permits the driver to activate the brake lights at will, and rapidly flash them to pre-alert unconscious tailgaters of an anticipated reduction in speed. A statement by the National Automobile Club reported in the San Jose News and Mercury on Jan. 26, 1976 notes that 3.8 million rear end collisions occur annully in the United States, and urges drivers to reduce the probability of rear end collisions by pumping the brake pedal causing the brake lights to flash. This recommended safety technique may be more appropriately effected by rapidly operating switch 110 without causing additional brake wear.

If desired, deacceleration circut 100 may be provided with a flasher unit 190 which automatically flashes lights 180 when switch 110 is depressed. In the FIG. 1 embodiment, circuit 100 is additionally provided with a mode switch 192 by which the driver may elect the flasher mode or the normal mode. In the flasher mode the brake warning signal and the downshift warning signal each have their own identities—the brake warning signal is firm, and the downshift warning signal is flashing. In the normal mode both warning signals are firm (unless manually flashed) and accomodate possible statutory requirements that deacceleration warning signals be firm.

Manual circuit 100 may be employed as an emergency flasher device or generally to communicate to other motorists on any conventional or prearranged basis.

FIG. 2A shows downshift deacceleration switch 210A mounted on the top of elongated gearshift knob 220A. The driver approaches knob 220A with his right hand from the right side of switch 210A. The driver then closes his hand around knob 220A with his fingers curling around the back of knob 220A from right to left and his thumb on the left side of knob 220A. This position provides a firm grasp for downshifting and the thumb can easily be raised to press down on top mounted switch 210A to energize the brake lights. That is, the top of knob 220A is unoccupied during the normal shifting maneuver but is readily accessable by the thumb during downshift deacceleration.

FIG. 2B shows a T-shaped transmission leverage assembly commonly employed in the manual floor mounted portion of automatic transmissions. Switch 210B mounted on the left end of horizontal knob 220B. The driver approaches knob 220B with his right hand from the top, and closes his hand therearound with his fingers extending across the back from top to bottom. His thumb extends under knob 220B on the left side during the shifting manuever and has ready access to end mounted switch 210B.

TAPE SWITCH

FIG. 2C shows elongated or tape switch 210C mounted on knob 220C. Tape switch 210C is continuously activatable along its length and does not require as precise a hand orientation as the conventional round button type switches of FIG. 1, 2A, and 2B. Tape switch may be formed by a pair of flexible conductor strips normally held in spaced relationship by a resilient insulating strip sandwiched therebetween. The assembly is contained in an insulative housing preferably of rectangular cross section with an adhesive along the bottom surface for engaging knob 220C. At least one of the conduct strips has a series of contact dimples therein extending toward the other conductive strip through a series of apertures in the insulating strip. To activate tape switch 210C, external pressure is applied to one of the conductive strips urging it toward the other strip. The dimples extend further into the apertures and contact the other strip.

Tube switch 210 occupies an easily accessible elongated zone on knob 220 as opposed to the spot occupancy of switch 110 in the FIG. 1 embodiment. Tube switch 210 extends across knob 220 along a zone which is normally unoccupied during upshifting but is readily accessible during downshifting for optimizing the accessability—inadvertent activation trade off. Tube switch 210 may extend vertically as shown, or along any curved or straight path which suits the driver.

CURVED MOUNTING STRIP

FIG. 3 shows a manual downshift switch 310 which may be mounted on knob 320 at any azimuth or height, permitting switch 320 to be tailor positioned to suit each driver. Switch 310 is secured to the upper end of an elongated curved mounting strip 322. The curve of strip 322 preferably matches the contour of knob 320. Wires 330 extend down protective sleeve 322 over shift stick 340. The lower end of strip 322 is positioned on shift stick 340 via elongated slot 342 and secured by the upward locking action of boss 344 which urges strip 322 against the bottom of knob 320. In order to position switch 310, knob 320 is preferably first turned down onto stick 340 snugly engaging curved strip 322 between boss 344 and the bottom of knob 320. Switch 310 and curved strip 322 are then held in the desired position while knob 320 is firmly tightened. Switch 310 may be repositioned by loosening knob 320 releasing strip 322. While in the released condition strip 322 may be pivoted around stick 340 placing switch 310 at the desired azimuth and repositioned along elongated slot 342 to place switch 310 at the desired height.

SLOTTED SPHERE EMBODIMENT

FIG. 4 shows switch 410 mounted on hollow spherical knob 420. Knob 420 has a slot 422 which receives shift stick 440. Knob 420 is releasably engaged to stick 440 at any point along slot 422 by external locknut 442 which turns upwards urging concave washer 444 into contact with the external surface of knob 420 proximate the point of engagement. Internal locknut pair 446A and 446B retain convex washer 448 against the corresponding inner surface of knob 420. When locknut 442 is released, switch 410 may be redirected at any azimuth by rotating knob 420 about vertical axis 452. Switch 410 may simultaneously be repositioned in elevation by tilting knob 420 about horizontal axis 454 shifting the point of engagement along slot 422. Thus, switch 410 may be positioned anyplace on a circle about vertical axis 454 by turning knob 420. The height of the circle is established by tilting knob 420 about horizontal axis 454. These aximuth and elevation adjustments permit switch 410 to be placed anywhere on the surface of a spherical segment of revolution about vertical axis 454. The diameter of the spherical segment is the diameter of knob 420 and the height or arcuate dimension of the spherical segment is the arcuate dimension of slot 422.

The FIG. 4 device is preferably assembled mounting the locknut and washers on stick 440 in the order shown providing a space between convex washer 448 and concave washer 444. Locknuts 446A and B are counted tightened on stick 440 and inserted into knob 420 along with convex spacer 448 through aperture 422 which joins slot 422. Stick 440 is then positioned along slot 422 with convex washer 448 on the inside of knob 420 and concave washer 444 on the outside. Locking nut 442 is turned upward to secure the engagement of washers 444 and 448 against knob 420. Switch 410 is then mounted in aperture 424.

DOUBLE HEMISPHERE EMBODIMENT

FIG. 5 is a broken away view showing downshift switch 510 mounted on knob 520 formed by hemispheres 522A and 522E. Hemispheres 522A and 522E are held together along annular interface trim 526 by internal bolt 528 which is perpendicular to the plane defined by the circle of interface trim 526. Internal bolt 528 extends inwardly from the center of hemisphere 522A to engage threaded hub 532 which extends inwardly from the center of hemisphere 522E. Knob 520 is secured to stick 540 by locking nut 544 and washer 546.

Switch 510 may be positioned at the desired azimuth by loosening locking nut 544 and rotating both hemispheres 522A and E as a unit about vertical azimuth axis 522 which is concentric with stick 540. Switch 510 may be positioned at any elevation by loosening internal bolt 528 and rotating hemisphere 522E about tilted elevation axis 554 which is concentric with internal bolt 528. Switch 510 may be positioned at any point on the surface of knob 520 by rotating both hemispheres 522 about vertical axis 552 and rotating hemisphere 522E about tilted axis 544.

Wires 530 extend from switch 510 down the hollow interior of stick 540 exiting at bottom slot 556. Wires 530 then connect to an electrical source such as the vehicle storage battery and to any set of rear lamps 580 such as the directional indicator, the parking lights, or the brake lights.

CONCLUSION

The objects of this invention have been accomplished by providing a downshift warning switch conveniently positioned on a gear shift lever. The driver can manually activate his rear lights during downshift deacceleration to warn of an anticipated reduction is speed.

Clearly, various changes may be made in the described apparatus and technology without departing from the scope of the invention. For example, the downshift warning device may be employed on a steering column mounted transmission lever, or on the manual portion of an automatic transmission. Further, the switch may be mounted on the transmission lever itself proximate the knob in a normally unoccupied position which is readily accessible during downshifting.

I claim as my invention:

1. A device which permits a driver to manually activate vehice braking indicators during transmission downshift deacceleration while repositioning a transmission shift lever via a shift knob releasably mounted on a threaded end portion of the transmission shift lever, comprising:

a spherical shift knob formed by an upper hemisphere and a lower hemisphere;

a manually operated switch mounted on the surface of the upper hemisphere for activating the braking indicators;

threaded means adapted to releasably engage the threaded end portion of the transmission shift lever for releasably securing the lower hemisphere to the transmission shift lever;

the lower hemisphere adapted to be releasably mounted on the shift lever for permitting the shift knob to be rotated when released about a first axis extending through the threaded end portion;

the upper hemisphere releasably engaging the lower hemisphere along a plane of engagement which is generally inclined with respect to the first axis permitting the upper hemisphere to be rotated when released about a second axis orthoganal to the plane of engagement and generally inclined with respect to the first axis; and securing means extending between the two hemisphere for releaseably engaging the upper hemisphere to the lower hemisphere;

whereby the manual switch may be respositioned with respect to the driver anywhere within an area on the sphere defined by rotating the shift knob about the first axis and rotating the upper hemisphere about the second axis.

2. The device of claim 1, wherein the plane of engagement between the lower hemisphere and the upper hemisphere is inclined at a relatively small angle with respect to the first axis for increasing the area on the sphere within which the switch may be repositioned.

3. The device of claim 1, wherein the manually operated switch is a push-to-close type.

4. The device of claim 1, wherein the securing means is elongated and has threads on one end thereof, and one of the hemispheres has cooperating threads for releasably engaging the two hemispheres.

5. The device of claim 4, wherein the elongated securing means extends through an aperture in the other one of the hemispheres and is externally accessible for rotation to releasably engage the cooperating threads.

6. The device of claim 5, wherein the upper hemisphere has the cooperating threads and the lower hemisphere has the access aperture.

7. The device of claim 6, wherein the lower hemisphere is counter sunk about the access aperture for permitting the accessible end of the elongated means to be flush with the surface of the lower hemisphere.

8. The device of claim 1, wherein the lower hemisphere has a threaded aperture adapted for receiving the threaded end portion of the transmission shift lever.

9. The device of claim 8, wherein the threaded means releasably engages the lower hemisphere on the threaded end portion of the transmission shift lever by locking against the lower hemisphere by means of the threads on the end portion of the transmission shift lever.

10. The device of claim 9, wherein the threaded means is positioned outside the lower hemisphere on a region of the threaded end portion of the transmission shift lever, which region is external to the lower hemisphere.

* * * * *